UNITED STATES PATENT OFFICE.

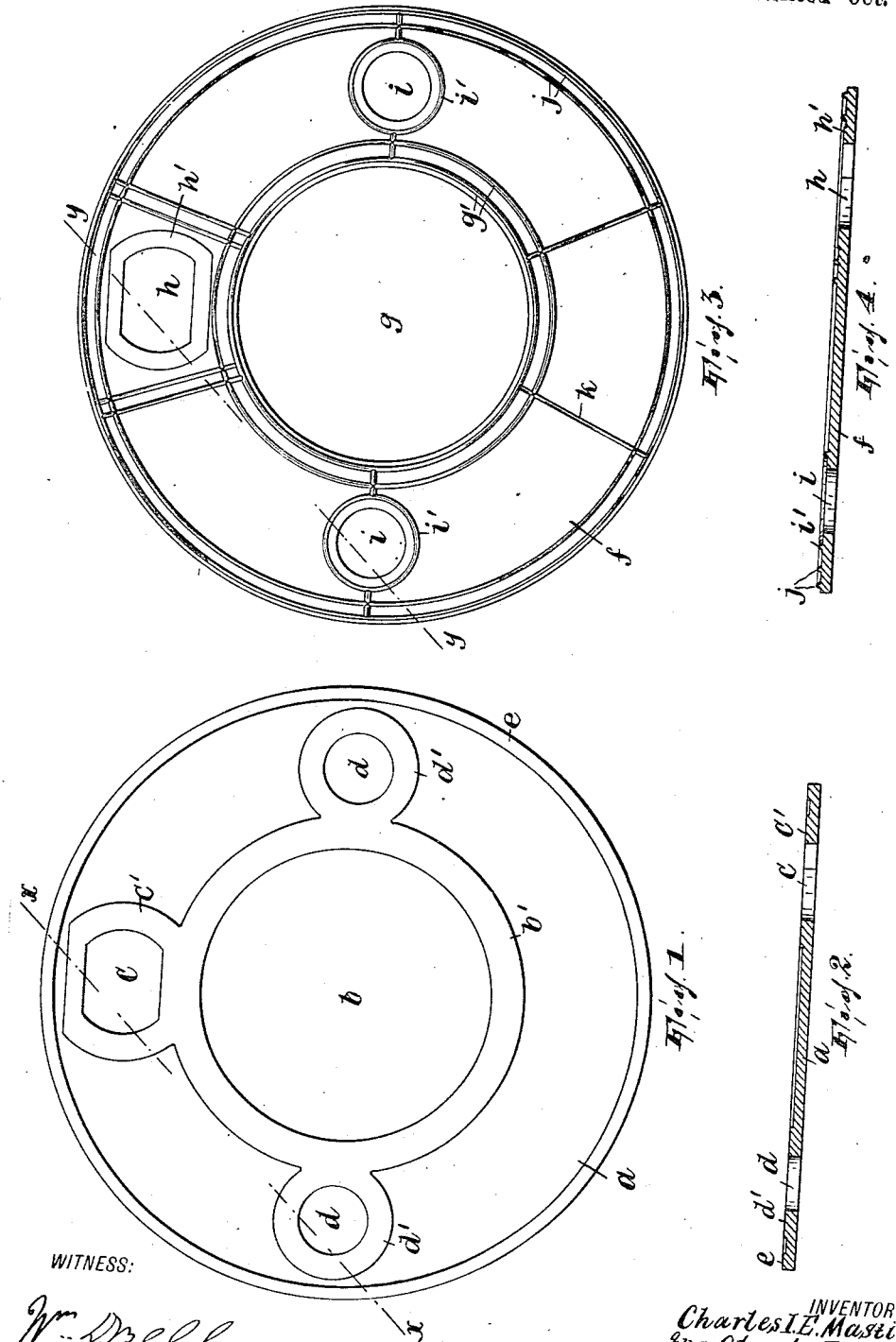

CHARLES I. E. MASTIN AND CHARLES R. MASTIN, OF HAWTHORNE, NEW JERSEY.

PACKING.

1,245,002.   Specification of Letters Patent.   Patented Oct. 30, 1917.

Application filed March 4, 1916.  Serial No. 82,088.

*To all whom it may concern:*

Be it known that we, CHARLES I. E. MASTIN and CHARLES R. MASTIN, citizens of the United States, residing at Hawthorne, in the county of Passaic and State of New Jersey, have invented certain new and useful Improvements in Packing, of which the following is a specification.

Our invention relates to that type of gaskets, usually composed of rubber, which are subjected to pressure between the parts forming the joint to be sealed, and it consists in certain improvements having for their principal object to produce a more hermetic and otherwise perfect seal than is possible by gaskets of this class heretofore used. It is known to be practically impossible to obtain uniformly tight joints with compressible gaskets of perfectly flat or plain form, especially where, as is common, they are used in high pressure fluid systems, in consequence of which it has been proposed to provide around the openings in such gaskets, and especially around the fluid passage openings therein, upstanding narrow ribs or ridges which are designed to produce a hermetic seal without necessitating excessive pressure to be exerted on the gasket. Such ridges or ribs in many instances of their use serve well the purpose in hand, but they often give rise to leakage if they are indented by a piece of grit or other foreign particle or by a bur or other form of roughness or irregularity of surface in or on one of the members of the joint, for instance adjacent a port or bolt-hole therein. Again, being narrow relatively to their height, they are likely to give way to the fluid pressure; or, if subjected to sufficient clamping pressure to prevent their thus yielding to the fluid pressure, then to bunch or swell, the consequent displacement of the rubber thereby necessitating and causing their tilting in places, or otherwise departing from their normal form in plan, so that after all the seal is not uniformly good and leakage follows. According to this invention we form a table or tables around the opening or openings— and particularly that or those where the purposes to which the gasket is to be put require the highest state of compression to be developed in order to produce hermetic sealing—that is broad relatively to its height and has its top face in a plane close to that of the face of the gasket on which it is formed. Such a table can be indented by a piece of grit or any irregularity in the surface of a joint member that would be perhaps passed without notice without its integrity or continuity as a seal being interrupted; and being low-lying it does not require much pressure to bring the main face of the gasket into contact with the surface opposed thereto, and yet that part of the gasket which includes the table assumes the desired greatest state of compression necessary in order to insure against leakage at the point where leakage should be first of all opposed, to wit, around an opening through the gasket, and the clamping pressure cannot malform it. In gaskets of this class it is found necessary to prevent tilting of the gasket when the pressure of the bolts or other compressing means is applied, and to this end we may provide another table or tables, such as that indicated above, at such other place or places on the gasket as the circumstances may require. Or we may employ at such place or places ribs or ridges, like those already mentioned, to compensate for the height of the table; but in cases where ribs or ridges are thus used we make them somewhat higher than the table so that, though thinner or narrower than the tables, their resistance will substantially balance that of the table when the parts are bolted up to the desired limit.

We now proceed to describe our invention in detail, having reference to the accompanying drawings, wherein, Figure 1 is a plan view of one form of gasket constructed in accordance with this invention, and Fig. 2 a sectional view thereof on the line *x—x* in Fig. 1;

Fig. 3 is a plan view, and Fig. 4 a sectional view on line *y—y* in Fig. 3, of another form of the improved gasket.

Referring, first, to Figs. 1 and 2 *a* is the gasket composed of rubber and being a disk of substantially uniform thickness and formed with a large central hole *b*, a port-hole *c* and the bolt-holes *d*. Around the port-hole *c* one face of the gasket has built up thereon a low-lying relatively broad table *c'*. The transverse dimension of this table is considerably greater than its height, as shown; thus, while the thickening of the gasket immediately at and around the port will result in that higher state of compression which is needed directly adjacent to the source of fluid pressure (the port-hole *c*) when the gasket has been put under the necessary pressure, if particles of grit or the like become interposed or irregularities in the surface of the joint member which is opposed to the table-side of the gasket exist the continuity of the seal formed by the table with said surface will not be interrupted, nor can the clamping pressure affect the integrity of the table as a sealing medium. The height of the table is such that its top face is in a plane close to that of the corresponding face of the gasket, so that as explained it does not require much pressure to bring the said face of the gasket into contact with the surface opposed thereto. If desired, a similar low-lying broad table $b'$ may be formed around the central hole $b$, and another, $d'$, around each of the bolt holes $d$. In the particular gasket shown in Figs. 1 and 2 the portions $b'$ and $d'$ not only perform the function of leveling-up the gasket with reference to the surface against which they bear (some such leveling-up means being generally required, as already explained, especially when the main point to be sealed is more or less offset, as the port-hole $c$) but insure against leakage with reference to the hole $b$ or holes $d$ in a case where unusually heavy fluid pressures are to be resisted. A similar table $e$ may be formed around the margin of the gasket.

Referring, now, to Figs. 3 and 4, here the gasket $f$ has a low-lying relatively broad table $h'$ around its port hole $h$; but at other places, as around its central holes $g$ and around its bolt-holes $i$ and also around its margin and extending radially thereof it has the narrow ribs or ridges $g'$, $i'$, $j$ and $k$, respectively. The ribs or ridges serve to level-up the gasket, but to properly perform their function in that respect, since they are narrow they are made appreciably higher than the table $h'$. Thus they are adapted to oppose a resistance to the pressure of the bolts or other clamping means which substantially counterbalances that of the table $h'$, so that by the time the compression has proceeded so far that the main portion of the surface of the gasket is in contact with the surface of the joint member opposed thereby such contact will be practically uniform throughout the whole area of the gasket to complete or perfect its intended sealing action.

A seal adapted to oppose extraordinary resistance to high pressure is shown at the top of Fig. 3, where the table is surrounded by a plurality of ribs.

Having thus fully described our invention, what we claim as new and desire to secure by Letters Patent is:—

1. The herein described elastic gasket adapted to be compressed between opposite joint surfaces and having a plurality of openings extending therethrough, said gasket having a relatively broad low-lying integral table extending around one of said openings and an integral rib higher but narrower than the table also extending around one of said openings, the table and rib being formed on the sealing face of the gasket.

2. The herein described elastic gasket adapted to be compressed between opposite joint surfaces and having a plurality of openings extending therethrough, said gasket having a relatively broad low-lying integral table extending around one of said openings and an integral rib higher but narrower than the table extending around the other opening, the table and rib being formed on the sealing face of the gasket.

3. The herein described elastic gasket adapted to be compressed between opposite joint surfaces and having an opening extending therethrough, said gasket having a relatively broad low-lying integral table around said opening and one or more narrower ribs around the table.

In testimony whereof we affix our signatures.

CHARLES I. E. MASTIN.
CHARLES R. MASTIN.